(12) United States Patent
Ju

(10) Patent No.: US 10,739,655 B2
(45) Date of Patent: Aug. 11, 2020

(54) OPTICAL WAVEGUIDE DISPLAY SUBSTRATE, MANUFACTURING METHOD THEREOF, AND DISPLAY APPARATUS

(71) Applicant: BOE TECHNOLOGY GROUP CO., LTD., Beijing (CN)

(72) Inventor: Changcheng Ju, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/667,859

(22) Filed: Aug. 3, 2017

(65) Prior Publication Data

US 2018/0046052 A1 Feb. 15, 2018

(30) Foreign Application Priority Data

Aug. 11, 2016 (CN) .......................... 2016 1 0659323

(51) Int. Cl.

| G02F 1/141 | (2006.01) |
|---|---|
| G02F 1/315 | (2006.01) |
| G02B 3/00 | (2006.01) |
| G02F 1/13 | (2006.01) |
| G02F 1/1334 | (2006.01) |
| G02F 1/1337 | (2006.01) |
| G02F 1/137 | (2006.01) |
| G02F 1/13357 | (2006.01) |

(52) U.S. Cl.
CPC ............ *G02F 1/141* (2013.01); *G02B 3/0012* (2013.01); *G02F 1/1326* (2013.01);
(Continued)

(58) Field of Classification Search
CPC ........ G02F 1/1326; G02F 1/136; G02F 1/135; G02F 1/1334; G02F 1/141; G02F 1/1337;
(Continued)

(56) References Cited

U.S. PATENT DOCUMENTS 5,691,795 A * 11/1997 Doane ..................... C09K 19/02
349/115
5,831,700 A 11/1998 Li et al.
(Continued)

FOREIGN PATENT DOCUMENTS

| CN | 1132559 A | 10/1996 |
|---|---|---|
| CN | 103293744 A | 9/2013 |

(Continued)

OTHER PUBLICATIONS

Jianjun, Li, et al."The Study of Polymer Network Stabilized Ferroelectric Liquid Crystal"; Chinese Journal of Liquid Crystals and Displays; vol. 13, No. 1; Mar. 1998.
(Continued)

*Primary Examiner* — Thien M Le
*Assistant Examiner* — April A Taylor
(74) *Attorney, Agent, or Firm* — Nath, Goldberg & Meyer; Joshua B. Goldberg

(57) ABSTRACT

The present disclosure belongs to the field of display technology, and particularly relates to an optical waveguide display substrate, a manufacturing method thereof, and a display apparatus. The optical waveguide display substrate comprises a side light source, an alternating-electric-field electrode structure, and a light scattering layer, wherein the side light source is provided at at least one side of the light scattering layer, the light scattering layer is switchable between a transparent state and a light scattering state under influence of an alternating electric field applied by the alternating-electric-field electrode structure, so that incident light from the side light source is scattered out of the optical waveguide display substrate to form a display image, and the light scattering layer comprises a polymer network and a light scattering liquid crystal material.

11 Claims, 1 Drawing Sheet

(52) U.S. Cl.
CPC ...... *G02F 1/1334* (2013.01); *G02F 1/133707* (2013.01); *G02F 1/315* (2013.01); *G02F 1/133615* (2013.01); *G02F 2001/13345* (2013.01); *G02F 2001/13756* (2013.01); *G02F 2001/13775* (2013.01); *G02F 2001/1412* (2013.01)

(58) Field of Classification Search
CPC ......... G02F 1/133703; G02F 1/133711; G02F 1/133615
See application file for complete search history.

(56) References Cited

U.S. PATENT DOCUMENTS

| | | | | |
|---|---|---|---|---|
| 6,897,936 | B1* | 5/2005 | Li | C09K 19/544 252/299.01 |
| 2008/0252822 | A1* | 10/2008 | De Koning | G02F 1/1334 349/88 |

FOREIGN PATENT DOCUMENTS

| | | |
|---|---|---|
| CN | 104656335 A | 5/2015 |
| JP | 2002229071 A | 8/2002 |

OTHER PUBLICATIONS

Jianjun, Li "Studies of V-Shape Electric-Optic Characteristics of Polymer Stabilized Ferroelectric Liquid Crystals"; Changchun Institute of Optics and Fine Mechanics, Academia; Jun. 2000.

Book based on the lectures of undergraduate and postgraduate students majoring in optoelectronic information technology for many years; Dec. 13, 2018.

First Office Action dated Jan. 2, 2019 corresponding to Chinese application No. 201610659323.0.

\* cited by examiner

OPTICAL WAVEGUIDE DISPLAY SUBSTRATE, MANUFACTURING METHOD THEREOF, AND DISPLAY APPARATUS

CROSS REFERENCE TO RELATED APPLICATION

The present application claims the priority of Chinese Patent Application No. 201610659323.0 filed on Aug. 11, 2016 with the China Patent Office, the entire contents of which are fully incorporated herein by reference.

TECHNICAL FIELD

The present disclosure relates to the field of display technology, and particularly relates to an optical waveguide display substrate, a manufacturing method thereof, and a display apparatus.

BACKGROUND

With the development of display technology, the panel display, represented by liquid crystal display apparatuses, has come to be the current mainstream. And with the development of new materials and new technologies, new display technologies, such as an optical waveguide display technology, are derived based on the liquid crystal display apparatuses. Most of the current liquid crystal display apparatuses adopt a nematic liquid crystal as the medium, which has a problem of low response speed and high driving voltage.

Thus, how to reduce the driving voltage and response time of the optical waveguide display devices has become a technical problem to be urgently solved at present.

SUMMARY

In one aspect of the disclosure, an optical waveguide display substrate is provided, comprising a side light source, an alternating-electric-field electrode structure and a light scattering layer, wherein the side light source is provided at at least one side of the light scattering layer, the light scattering layer is configured to be switchable between a transparent state and a light scattering state under influence of an alternating electric field applied by the alternating-electric-field electrode structure, so that the incident light from the side light source is scattered out of the optical waveguide display substrate to form a display image, and the light scattering layer comprises a polymer network and a light scattering liquid crystal material.

In one embodiment, the polymer network is formed of polymeric monomers having liquid crystal phase.

In one embodiment, a mass proportion of the polymer network and the light scattering liquid crystal material is within a range of (1-10):(99-90).

In one embodiment, the polymeric monomers material having liquid crystal phase is selected from the group consisting of bi-acrylate, epoxy acrylate, polyurethane acrylate, any other unsaturated polyester prepolymer and combinations thereof.

In one embodiment, the light scattering liquid crystal material comprises at least one of the group consisting of a ferroelectric liquid crystal material and an antiferroelectric liquid crystal material. The ferroelectric liquid crystal material comprises at least one of the group consisting of benzyl ferroelectric liquid crystal and aryl carboxylate ferroelectric liquid crystal, and the antiferroelectric liquid crystal material comprises at least one of the group consisting of MHTAC, 10B1M5 and MHPOBC.

In one embodiment, the polymeric monomers are bi-acrylate monomers, and the light scattering liquid crystal material is a ferroelectric liquid crystal material of SCE-9, a phase transition sequence of which is Iso(114° C.)N*-(91° C.) SA-(59° C.) Sc*.

In one embodiment, the alternating-electric-field electrode structure comprises a first electrode and a second electrode that are respectively provided at two sides of the light scattering layer; the optical waveguide display substrate further comprises a first alignment layer provided between the first electrode and the light scattering layer and a second alignment layer provided between the second electrode and the light scattering layer; wherein the first electrode has a plate shape and is configured to provide a common reference voltage, and the second electrode comprises a plurality of sub-electrodes arranged in an array, each of the sub-electrodes being configured to provide the light scattering liquid crystal material in its corresponding area with a deflection voltage that forms a scattering angle.

In another aspect of the disclosure, a display apparatus is provided, comprising the optical waveguide display substrate described above.

In further another aspect of the disclosure, a manufacturing method of the optical waveguide display substrate described above is provided, comprising a step of forming the light scattering layer, wherein the step of forming the light scattering layer comprises:

incorporating polymeric monomers and a photosensitizer into the light scattering liquid crystal material in a darkroom to form a mixture;

stirring and heating the mixture, and perfusing the mixture in the alternating-electric-field electrode structure to form a liquid crystal cell; and curing the liquid crystal cell under ultraviolet irradiation while applying an alternating electric field to the liquid crystal cell to obtain the optical waveguide display substrate that comprises polymer network stabilized ferroelectric liquid crystals.

In one embodiment, a mass proportion of the polymeric monomers, the photosensitizer, and the light scattering liquid crystal material in the mixture is within a range of (3-5):(0.5-1.5):(96.5-93.5).

In one embodiment, before perfusing the mixture in the alternating-electric-field electrode structure to form the liquid crystal cell, the manufacturing method further comprises stirring and heating the mixture on a magnetic heating stirrer with a stirring duration ranging from 20 to 40 minutes and a heating temperature ranging from 80 to 100° C.

In one embodiment, curing the liquid crystal cell under ultraviolet irradiation ranges from 20 to 40 minutes, and the alternating electric field is of (±50V, 10 Hz), such that the light scattering liquid crystal material forms a stripe texture during a polymerization process of monomers of the polymer network.

DETAILED DESCRIPTION OF THE EMBODIMENTS

In order to make those skilled in the art better understand the technical solutions of the present disclosure, the optical waveguide display substrate, the manufacturing method thereof, and the display apparatus of the present disclosure are further described in detail below in conjunction with the accompanying drawings and specific implementations.

First Embodiment

This embodiment provides an optical waveguide display substrate and a manufacturing method thereof, and the optical waveguide display substrate is capable of improving response speed of the display apparatus and reducing the driving voltage.

The optical waveguide display substrate comprises a side light source, an alternating-electric-field electrode structure, and a light scattering layer. The side light source is provided at at least one side of the light scattering layer. The light scattering layer is configured to be switchable between a transparent state and a light scattering state under the influence of an alternating electric field applied by the alternating-electric-field electrode structure, so that the incident light from the side light source is scattered out of the optical waveguide display substrate at a desired direction and thereby forms a display image. The light scattering layer comprises a polymer network and a light scattering liquid crystal material. The optical waveguide display substrate is capable of improving the response speed, reducing the driving voltage, and thereby improving working efficiency of the device.

Figure 1:
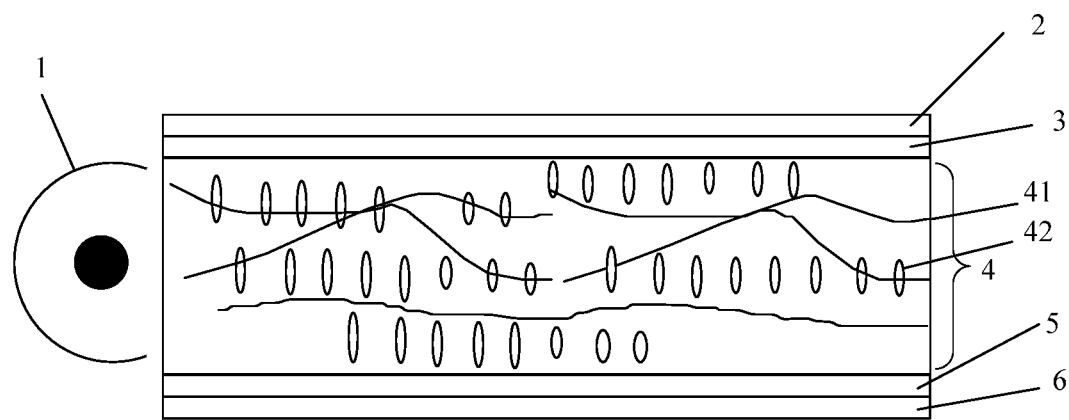
FIG. 1 is a schematic diagram illustrating a structure of an optical waveguide display substrate in a first embodiment of the present disclosure.

As shown in FIG. 1, the optical waveguide display substrate comprises a side light source 1, a transparent first substrate 2, a first electrode 3, a light scattering layer 4, a second electrode 5, a transparent second substrate 6 etc. The side light source 1 provides incident light by an edge LED, and the angle of the incident light may be adjusted by a condenser lens. The first electrode 3 is a common electrode and integrated with a polyimide (PI) alignment layer; the second electrode 5 is a driving electrode and integrated with a PI alignment layer; the light scattering layer 4 is a mixing layer of the polymer network 41 and the ferroelectric liquid crystals 42 (wherein an example is illustrated by selecting the ferroelectric liquid crystal material as the light scattering liquid crystal material, such as SCE-9; and the antiferroelectric liquid crystal material is likewise); and the first electrode 3 and the second electrode 5 provide the light scattering layer 4 with an alternating electric field.

According to the light transmission principle, the light can be limited within a specific area to propagate, and in most cases, the light can be limited within a limited cross section perpendicular to the propagation direction, and the medium confining the guided wave referred to as optical wave guide. Based on the optical wave guide principle, optical waveguide devices are widely used in fields, such as information acquisition, information transmission and information processing or the like. The optical waveguide display substrate of this embodiment is a transparent optical waveguide display substrate designed based on the liquid crystal cell, wherein the core structure is the light scattering layer 4. In the optical waveguide display substrate, the liquid crystal cell is designed as a light guiding plate structure, and perfusing therein a mixture of liquid crystal molecules and polymerizable small molecules. Small molecules are polymerized using UV irradiation to form a polymer network, so as to confine the scattering of the light. In current liquid crystal display substrates, in order to control an arrangement state of the liquid crystal when no voltage is applied, a layer of PI alignment film is coated on an inner surface of the substrate forming the liquid crystal cell to fix the liquid crystal molecules on the surface in a desired orientation, such that the orientation of the liquid crystal molecules will be in parallel with the direction of the electric field when a voltage is applied on the liquid crystal layer. However, in the liquid crystal cell of the optical waveguide display substrate of this embodiment, under irradiation of UV (ultraviolet) light, small monomer molecules that are polymerizable form an irregularly arranged polymer network, which causes arrangement directions of molecules in the light scattering liquid crystal material (such as, ferroelectric liquid crystal material or antiferroelectric liquid crystal material) to be incongruent with each other after a voltage is applied, thereby the incident light being scattered.

In this embodiment, the ferroelectric liquid crystal material or the antiferroelectric liquid crystal material is taken as an example of the light scattering liquid crystal material, and the mass proportion of the polymer network formed by polymeric monomers having the liquid crystal phase and the light scattering liquid crystal material is within a range of (1-10):(99-90). By setting the proportion of the polymer network formed by polymeric monomers having the liquid crystal phase and the light scattering liquid crystal material, a light scattering liquid crystal having a stable polymer network can be formed.

Optionally, the polymeric monomers material having the liquid crystal phase is selected from the group consisting of bi-acrylate, epoxy acrylate, polyurethane acrylate, any other unsaturated polyester prepolymer and combinations thereof. Bi-acrylate is taken as an example of the polymer material having the liquid crystal phase in the optical waveguide display substrate of this embodiment.

Optionally, the light scattering liquid crystal material may comprise at least one of the group consisting of a ferroelectric liquid crystal material and an antiferroelectric liquid crystal material. The ferroelectric liquid crystal material comprises at least one of the group consisting of benzyl ferroelectric liquid crystal and aryl carboxylate ferroelectric liquid crystal, and the antiferroelectric liquid crystal material comprises at least one of the group consisting of MHTAC, 10B1M5 and MHPOBC. A ferroelectric liquid crystal SCE-9 is taken as an example of the light scattering material in the optical waveguide display substrate of this embodiment, and the antiferroelectric liquid crystal material or any similar material of the ferroelectric liquid crystal material described above can also be used.

Optionally, the light scattering liquid crystal material can also be at an amorphous phase, such as a ferroelectric liquid crystal material at an amorphous phase or an antiferroelectric liquid crystal material at an amorphous phase.

By taking the ferroelectric liquid crystal material as an example (the antiferroelectric liquid crystal material is likewise), an alternative manner of forming a mixing layer of the polymer network and the ferroelectric liquid crystal is that the polymeric monomers are bi-acrylate monomers, and the phase transition sequence of the ferroelectric liquid crystal material is Iso(114° C.)N*-(91° C.) SA-(59° C.) Sc*. And polymer network stabilized ferroelectric liquid crystals can be obtained by specifically proportioning the polymeric monomers material having the liquid crystal phase and the ferroelectric liquid crystal material described above.

Certainly, in order to enable the light scattering layer 4 to regulate the light, the alternating electric field plays an essential role. The alternating-electric-field electrode structure comprises a first electrode 3 and a second electrode 5 that are provided opposite to each other, and a first electrode 3 and a second electrode 5 are provided respectively at two sides of the light scattering layer 4; a first alignment layer (as shown in FIG. 1, it is integrated with the first electrode 3 and identified with the same reference sign) is provided between the first electrode 3 and the light scattering layer 4, and a second alignment layer (as shown in FIG. 1, it is integrated with the second electrode 5 and identified with the same reference sign) is provided between the second electrode 5 and the light scattering layer 4; wherein the first electrode 3 has a plate shape and is used to provide a common reference voltage, and the second electrode 5 comprises a plurality of sub-electrodes arranged in an array, each of the sub-electrodes being used to for the ferroelectric liquid crystal material in its corresponding area provide a deflection voltage that forms a scattering angle. Under the combined limitation of the PI alignment layer on the surface and the polymer network, a display image is formed with changes taken place in the voltage between electrodes of the liquid crystal cell.

Correspondingly, this embodiment further provides a manufacturing method of the optical waveguide display substrate described above, comprising steps of forming the light scattering layer 4.

The manufacturing method of the optical waveguide display substrate specifically comprises steps as follows:

1) Preparing a first substrate 2 and a second substrate 6.

In this step, cleaning glass substrates used as the first substrate 2 and the second substrate 6; forming a light transmission control component (generally a thin film transistor) above any one of the glass substrates as the first substrate 2 and the second substrate 6 to achieve controlling a voltage of a liquid crystal deflecting electrical field and so that the light emitted by a back light source is transmitted through the liquid crystal; and forming a colored display component above the other glass substrate to colorize the transmitted light.

2) Respectively forming a first electrode 3 integrated with a first alignment layer and a second electrode 5 integrated with a second alignment layer.

In this step, firstly, forming an electrode pattern respectively on the first substrate 2 and the second substrate 6. Spraying 200 nm ITO (Indium Tin Oxide) electrode material on one of substrates to form a pattern of the driving electrode using a photolithography process and an etching process; and spraying 350 nm ITO electrode material on the other substrates to form a pattern of the common electrode.

Secondly, spin coating is performed on the PI alignment film, which comprises respectively coating the first substrate 2 and the second substrate 6 with an alignment agent on one surface thereof having the electrode pattern, and then spin coating them in a spin coater for 120 s at a spinning speed of 2500 revolutions.

Thirdly, curing is performed on the PI alignment film, which comprises placing the first substrate 2 and the second substrate 6 that have been spin coated in an oven to be preheated at a temperature of 80° C. for 30 minutes, and then performing baking for 2 hours at a temperature of 200° C.

Finally, rubbing alignment is performed on the PI alignment film, which comprises placing the first substrate 2 and the second substrate 6 that have been dried on a sliding table of a rubbing machine to complete the rubbing alignment at a rotation speed of 2500 revolutions.

3) Printing a border adhesive and a conductive adhesive respectively on glass substrates at edges of the first substrate 2 and edges of the second substrate 6 using the silk-screen printing method.

4) Spraying spacers above any one of the first substrate 2 and the second substrate 6, performing curing after aligning and pressing them together, and forming an empty cell between the first substrate 2 or the second substrate 6, wherein the limited space formed by the empty cell is namely a restrained space of the light (that is, optical wave guide).

5) Perfusing the mixture of the light scattering liquid crystal and the polymeric monomers into the empty cell, and blocking the inlet thereof to form a light scattering layer 4.

In this step, firstly, the polymeric monomers and a photosensitizer is incorporated into the light scattering liquid crystal material in a darkroom to form a mixture. In this step, the mass proportion of the polymeric monomers, the photosensitizer, and the light scattering liquid crystal material in the mixture is within a range of (3-5):(0.5-1.5):(96.5-93.5); and manufacturing of the light scattering layer 4 can be achieved by presetting the proportion range of respective materials in the mixture. For example, the ferroelectric liquid crystal material is SCE-9, and its phase transition sequence is Iso(114° C.)N*-(91° C.) SA-(59° C.) Sc*, which finally forms a ferroelectric liquid crystal state; the monomers of the polymeric used is bi-acrylate having the liquid crystal phase; and the mass proportion of the polymeric monomers, the photo sensitizer, and the ferroelectric liquid crystal material is within a range of (3-5):(0.5-1.5):(96.5-93.5), such as 4:0.5:95.5.

Secondly, the mixture is stirred and heated, and then is perfused in the alternating-electric-field electrode to form a liquid crystal cell. In this step, the duration of stirring the mixture on a magnetic heating stirrer ranges from 20 to 40 minutes, and after heating the mixture to a temperature ranging from 80 to 100° C., a liquid crystal cell is formed by perfusion. By setting the stirring and heating conditions, manufacturing of the light scattering layer 4 can be achieved. For example, the mixture is stirred on the magnetic heating stirrer for 30 minutes, and after heating the mixture to 90° C., the mixture is perfused into the liquid crystal cell.

Finally, ultraviolet curing is performed on the liquid crystal cell and simultaneously the alternating electric field is applied to the liquid crystal cell to obtain a display substrate with polymer network stabilized ferroelectric liquid crystals. In this step, ultraviolet curing the liquid crystal cell is performed for 20 to 40 minutes, and the alternating electric field is (±50V, 10 Hz), such that the ferroelectric liquid crystal material forms a stripe texture during the polymerization process of monomers of the polymer network. For example, the liquid crystal cell is placed under the ultraviolet light and ultraviolet cured for 30 minutes, and an alternating electric field (±50V, 10 Hz) is simultaneously applied to the liquid crystal cell to assist the curing; and by setting the curing condition and the electric field condition, manufacturing of the light scattering layer 4 can be achieved to thereby obtain a polymer network stabilized ferroelectric liquid crystal cell.

In the optical waveguide display substrate of this embodiment of the present disclosure, continuous gray scale is achieved by controlling the density and alignment of the polymer network. Due to the low frequency alternating electric field simultaneously applied during the process of polymerizing monomers of the polymer network, a new arrangement texture, a stripe texture, of the liquid crystal molecules can be obtained, which further obtains a "V" shaped electro-optical characteristic curve that can achieve multi-level gray scale. The "V" shaped electro-optical characteristic curve means that the rotation direction of the light scattering liquid crystal varies linearly with the voltage, which makes it possible for different luminance under different voltages.

The combination of the nematic liquid crystal and the polymer network merely has a response speed about 10 ms at most, however, the combination of the light scattering liquid crystal material and the polymer network as adopted by this embodiment may theoretically has a response speed in the order of μs and further possesses an advantage of a wider view angle, which has a special advantage in many application scenarios.

Figure 2:
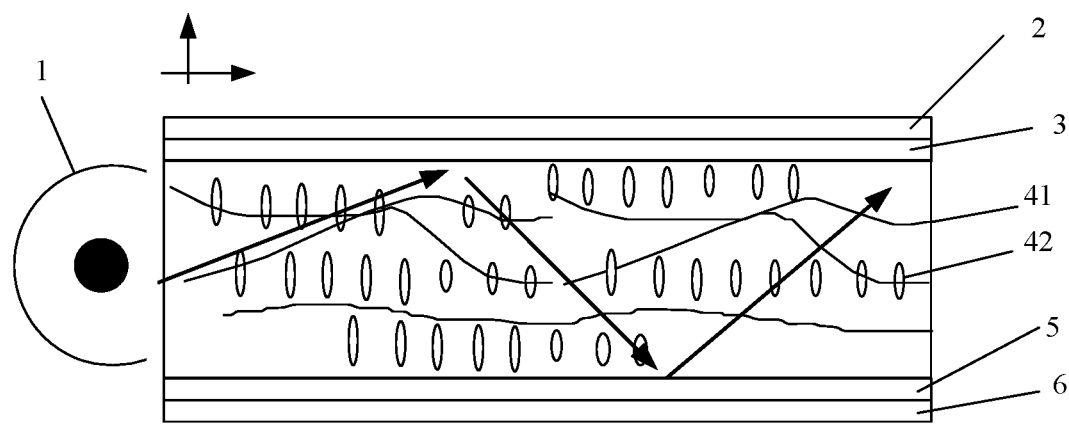
FIG. 2 is an optical path illustrating the optical waveguide display substrate of FIG. 1 in a working state with no voltage applied.
Figure 3:
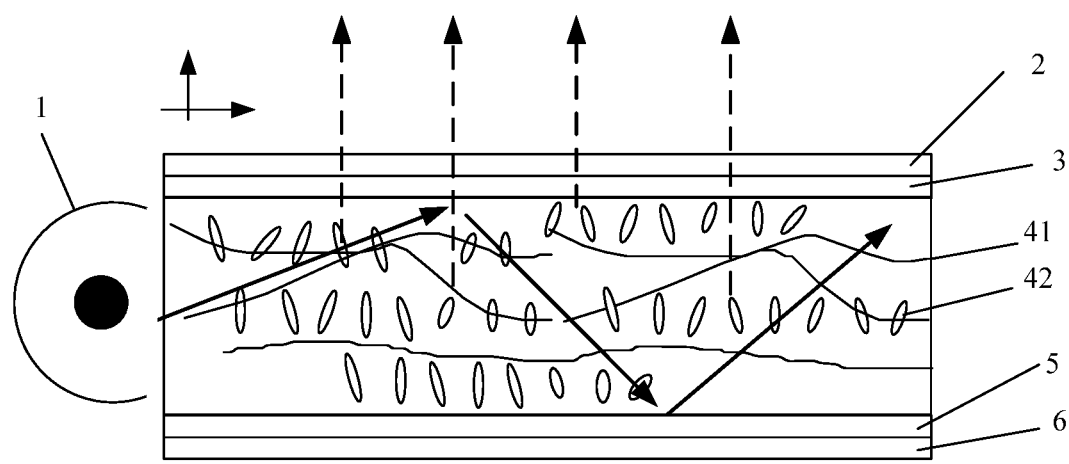
FIG. 3 is an optical path illustrating the optical waveguide display substrate of FIG. 1 in a working state with a voltage applied.

As shown in FIGS. 2 and 3, by taking ferroelectric liquid crystal material as an example (the antiferroelectric liquid crystal material is likewise), the working principle of the optical waveguide display substrate of this embodiment is as follows:

As shown in FIG. 2, when the side light source 1 is lighted, and no voltage is applied to the alternating-electric-field electrode structure, the entire optical waveguide display substrate stays in a transparent state (approximate to 99%), and the incident light is reflected between the first substrate 2 and the second substrate 6 (the solid arrow represents the reflected light).

As shown in FIG. 3, when the side light source 1 is lighted, and a voltage is applied to the alternating-electric-field electrode structure, the polymer network stabilized ferroelectric liquid crystals are used as the light scattering layer 4 in the optical waveguide display substrate, and by controlling the incident angle of the edge incident light, total reflection occurs between an air interface and the first substrate 2 or the second substrate 6 (the solid arrow represents the reflected light); simultaneously, under the combined influence of the PI alignment layer on the surface and the polymer network, as the voltage difference between the first electrode and the second electrode of the liquid crystal cell changes, orientations of the ferroelectric liquid crystals are incongruent with each other, and the refractive index comes to be different, which makes it possible to scatter the edge incident light out of the optical waveguide display substrate (the imaginary arrow represents the scattered light), and thereby forms an display image.

As can be seen, in the optical waveguide display substrate of this embodiment, the incident light is incident onto the liquid crystal cell at an incident angle larger than a critical angle of the total reflection, and since the refractive index of the glass and the refractive index of the ferroelectric liquid crystal are both around 1.5, the total reflection phenomenon can occur and the light can merely propagate within the liquid crystal cell. At this time, the applied voltage will change the orientation of the liquid crystal. The liquid crystal is simultaneously affected by the alignment film, the alternating electric field and the polymer network, especially, the polymer network that is randomly distributed, thus the liquid crystal may have a rather complex orientation and scatter the incident light out of the liquid crystal cell. The optical waveguide display substrate has a high light penetration, and the ferroelectric liquid crystal has a high response speed, which further reduces the driving voltage.

In the optical waveguide display substrate of this embodiment, the polymer network stabilized ferroelectric liquid crystals are used to form a light scattering layer, and under the combined limitation of the PI alignment layer on the surface and the polymer network, with changes taken place in the voltage between electrodes of the liquid crystal cell, the optical waveguide display substrate is switchable between a transparent state and a light scattering state, which can further improve the light transmissivity, increase the response speed, reduce the driving voltage of the optical waveguide display substrate, and enhance working efficiency of the device. Compared with the current optical waveguide display apparatuses formed by using the nematic liquid crystal, the arrangement manner of the liquid crystal under the influence of the voltage is different, and the response time and the driving voltage are both greatly reduced.

Second Embodiment

This embodiment provides an optical waveguide display substrate and a manufacturing method thereof, and the optical waveguide display substrate is capable of improving response speed of the display apparatus and reducing the driving voltage.

According to the optical waveguide display substrate of the first embodiment, further, the sub-electrodes in the second electrode 5 of the alternating-electric-field electrode structure has a plate shape; the optical waveguide display substrate further comprises control components, output terminal of each control components connected with the sub-electrodes, so as to provide the sub-electrodes a deflection voltage causing the light scattering liquid crystal deflected. Using the control components, the accurately control of the alignment of the ferroelectric liquid crystal is provided.

The light scattering liquid crystal may comprise a ferroelectric liquid crystal material or an antiferroelectric liquid crystal material.

In the optical waveguide display substrate of this embodiment, due to the influence of the polymer network, the alignment of the light scattering liquid crystal is gradually disordered under a state of power supply and scatters the light under the influence of differences in the refractive index to perform display. Compared with the current optical waveguide display apparatuses formed by using the nematic liquid crystal, the arrangement manner of the liquid crystal under the influence of the voltage is different, and the response speed and the driving voltage are both greatly improved.

Third Embodiment

This embodiment provides a display apparatus, comprising the optical waveguide display substrate of the first embodiment or the second embodiment.

The display apparatus may be any product or component having a display function, such as a transparent liquid crystal panel, a VR/AR apparatus, a windshield or an instrument panel of a vehicle, a museum vitrine, electronic paper, a mobile phone, a tablet computer, a TV set, a display, a notebook computer, a digital photo frame, a navigator etc.

The display apparatus has a higher response speed, a lower driving voltage, and a better display property.

It should be understood that, the above implementations are only exemplary implementations for illustrating the principle of the present disclosure, but the present disclosure is not limited thereto. Various variations and improvements can be made by those skilled in the art without departing from the spirit and essence of the present disclosure, and these variations and improvements are also considered to be within the protection scope of the present disclosure.

The invention claimed is:

1. An optical waveguide display substrate, comprising a side light source, an alternating-electric-field electrode structure, and a light scattering layer, wherein the side light source is provided at at least one side of the light scattering layer, the light scattering layer is configured to be switchable between a transparent state and a light scattering state under influence of an alternating electric field applied by the alternating-electric-field electrode structure, so that incident light from the side light source is scattered out of the optical waveguide display substrate to form a display image, and the light scattering layer comprises a polymer network and a light scattering liquid crystal material;
wherein the polymer network is formed of polymeric monomers having liquid crystal phase; and
wherein a mass proportion of the polymer network and the light scattering liquid crystal material is within a range of (1-10): (99-90),
wherein the polymeric monomers are bi-acrylate monomers, and the light scattering liquid crystal material is a ferroelectric liquid crystal material of SCE-9, a phase transition sequence of which is Iso(114° C.)N*-(91° C.) SA- (59° C.) Sc*.

2. The optical waveguide display substrate according to claim 1, wherein a material of the polymeric monomers having the liquid crystal phase is selected from the group consisting of bi-acrylate, epoxy acrylate, polyurethane acrylate, any other unsaturated polyester prepolymer and combinations thereof.

3. The optical waveguide display substrate according to claim 2, wherein the light scattering liquid crystal material comprises at least one of the group consisting of a ferroelectric liquid crystal material and an antiferroelectric liquid crystal material, the ferroelectric liquid crystal material comprising at least one of the group consisting of benzyl ferroelectric liquid crystal and aryl carboxylate ferroelectric liquid crystal, and the antiferroelectric liquid crystal material comprising at least one of the group consisting of MHTAC, 10B1M5, and MHPOBC.

4. The optical waveguide display substrate according to claim 2, wherein the alternating-electric-field electrode structure comprises a first electrode and a second electrode that are respectively provided at two sides of the light scattering layer;
the optical waveguide display substrate further comprises a first alignment layer provided between the first electrode and the light scattering layer and a second alignment layer provided between the second electrode and the light scattering layer;
wherein the first electrode has a plate shape and is configured to provide a common reference voltage, and the second electrode comprises a plurality of sub-electrodes arranged in an array, each of the sub-electrodes being configured to provide the light scattering liquid crystal material in its corresponding area with a deflection voltage that forms a scattering angle.

5. The optical waveguide display substrate according to claim 1, wherein the light scattering liquid crystal material comprises at least one of the group consisting of a ferroelectric liquid crystal material and an antiferroelectric liquid crystal material, the ferroelectric liquid crystal material comprising at least one of the group consisting of benzyl ferroelectric liquid crystal and aryl carboxylate ferroelectric liquid crystal, and the antiferroelectric liquid crystal material comprising at least one of the group consisting of MHTAC, 10B1M5, and MHPOBC.

6. The optical waveguide display substrate according to claim 1, wherein the alternating-electric-field electrode structure comprises a first electrode and a second electrode that are respectively provided at two sides of the light scattering layer;
the optical waveguide display substrate further comprises a first alignment layer provided between the first electrode and the light scattering layer and a second alignment layer provided between the second electrode and the light scattering layer;
wherein the first electrode has a plate shape and is configured to provide a common reference voltage, and the second electrode comprises a plurality of sub-electrodes arranged in an array, each of the sub-electrodes being configured to provide the light scattering liquid crystal material in its corresponding area with a deflection voltage that forms a scattering angle.

7. A display apparatus, comprising the optical waveguide display substrate of claim 1.

8. A manufacturing method of the optical waveguide display substrate of claim 1, comprising a step of forming the light scattering layer,
wherein, the step of forming the light scattering layer comprises:
incorporating polymeric monomers and a photosensitizer into the light scattering liquid crystal material in a darkroom to form a mixture;
stirring and heating the mixture, and perfusing the mixture in the alternating-electric-field electrode structure to form a liquid crystal cell; and
curing the liquid crystal cell under ultraviolet irradiation while applying an alternating electric field to the liquid crystal cell to obtain the optical waveguide display substrate comprising polymer network stabilized light scattering liquid crystals.

9. The manufacturing method of the optical waveguide display substrate according to claim 8, wherein a mass proportion of the polymeric monomers, the photosensitizer, and the light scattering liquid crystal material in the mixture is within a range of (3-5):
(0.5-1.5):(96.5-93.5).

10. The manufacturing method of the optical waveguide display substrate according to claim 8, wherein before perfusing the mixture in the alternating-electric-field electrode structure to form the liquid crystal cell, the manufacturing method further comprises stirring and heating the mixture on a magnetic heating stirrer with a stirring duration ranging from 20 to 40 minutes and a heating temperature ranging from 80 to 100° C.

11. The manufacturing method of the optical waveguide display substrate according to claim 8, wherein curing the liquid crystal cell under ultraviolet irradiation is performed for 20 to 40 minutes, and the alternating electric field is of (±50V, 10 Hz), such that the light scattering liquid crystal material forms a stripe texture during a polymerization process of monomers of the polymer network.

* * * * *